United States Patent [19]
Martin et al.

[11] Patent Number: 5,826,824
[45] Date of Patent: Oct. 27, 1998

[54] EMERGENCY EGRESS SYSTEM FOR AIRCRAFT

[75] Inventors: Randall J. Martin, Middletown; Thomas J. Toner, Milford, both of Conn.

[73] Assignee: Sikorsky Aircraft Corporation, Stratford, Conn.

[21] Appl. No.: 745,351

[22] Filed: Nov. 8, 1996

[51] Int. Cl.$^6$ ..................................................... B64C 1/14
[52] U.S. Cl. .................................. 244/129.3; 244/129.5; 244/137.2; 49/141; 49/466
[58] Field of Search ........................... 244/129.3, 129.4, 244/129.5, 137.1, 137.2; 49/141, 466

[56] References Cited

U.S. PATENT DOCUMENTS

| | | | |
|---|---|---|---|
| 2,255,725 | 9/1941 | Trescher | 49/141 |
| 2,412,787 | 12/1946 | Verhagen | 244/129.5 X |
| 2,549,110 | 4/1951 | Michael | 244/129.4 |
| 2,554,442 | 5/1951 | Ehret | 49/141 X |
| 2,572,124 | 10/1951 | Eichner | 49/141 |
| 2,830,843 | 4/1958 | Seaburg et al. | 49/141 X |
| 4,375,281 | 3/1983 | Nichols | 244/129.4 X |

FOREIGN PATENT DOCUMENTS

| | | | |
|---|---|---|---|
| 1293602 | 4/1962 | France | 244/129.3 |
| 350636 | 6/1931 | United Kingdom | 244/129.3 |
| 560578 | 11/1943 | United Kingdom . | |

*Primary Examiner*—William Grant
*Attorney, Agent, or Firm*—Brian A. Collins

[57] ABSTRACT

An emergency egress system (10) for facilitating emergency egress of passengers/crewmembers from an aircraft (4), which egress system (10) includes an egress panel (12), a panel frame (14) disposed about the egress panel (12) and a weather strip (16) defining back-to-back channels (18) for accepting the peripheral edges (12$_E$, 14$_E$) of the egress panel (12) and the panel frame (14). Furthermore, the emergency egress system (10) includes a plurality of retention devices (30) disposed about the periphery of the egress panel (12) for laterally retaining the egress panel (12) with respect to the panel frame (14) in a normal operating mode, a cam (80) operative to forcibly urge a portion of the weather strip (16) out of engagement with one of the peripheral edges (12$_E$, 14$_E$) and an actuation device (50) operative to sequentially disengage at least one of the retention devices (30) and actuate the cam (80) in an emergency operating mode. Following actuation, a passenger/crewmember may detach the egress panel (12) from the panel frame (14).

13 Claims, 7 Drawing Sheets

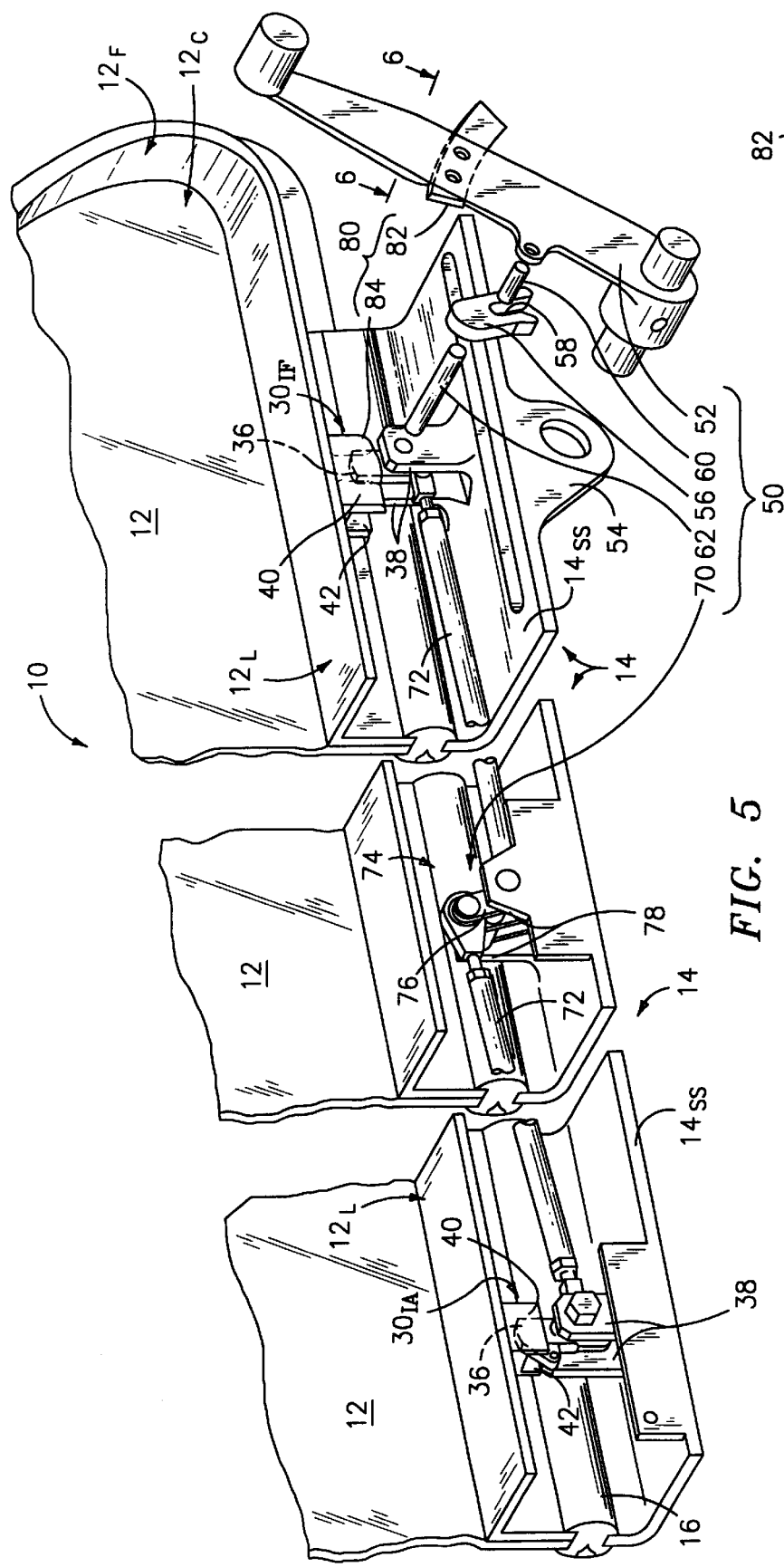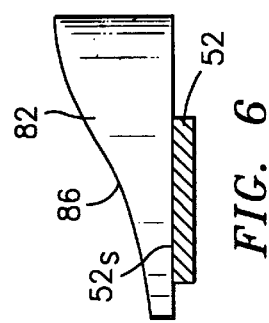
FIG. 5
FIG. 6

EMERGENCY EGRESS SYSTEM FOR AIRCRAFT

TECHNICAL FIELD

This invention is directed to systems for facilitating emergency egress from disabled aircraft, and, more particularly, to an emergency egress system suitable for use in combination with large egress panels, and, more particularly, to an emergency egress system which, inter alia, positively secures the egress panel to adjacent airframe structure, produces a water-tight seal therebetween, and facilitates rapid egress of passengers/crewmembers in an emergency situation.

BACKGROUND OF THE INVENTION

Aircraft certified for passenger transport are required, via Federal Aviation Administration (FAA) regulations, to provide emergency egress exits for both passengers and crewmembers. The type of aircraft and the passenger capacity thereof, typically determines the number, size and location of the egress exits. For example, a helicopter having a capacity of 19 passengers, such as an S-92® helicopter currently undergoing development at Sikorsky Aircraft Corporation, requires at least two cabin and two cockpit egress exits. It is a further requirement that there be at least one emergency exit on each side of the aircraft in both the cockpit and cabin. These exits, which are defined as "Type III" exits by FAA standards, must be sufficiently large to permit rapid egress, i.e., a minimum of 36 inches (91.4 cm) in height and 20 inches (50.8 cm) in width.

The comparably large dimensions of such "Type III" exits produce design and manufacturing difficulties relating to airframe structural integrity, water integrity, and producibility. More specifically, large suction loads are developed on the exterior surfaces of the egress panels (as used herein, the term "egress panels" denotes any hatch, window, or door used to permit access through the exit opening) which, consequently, produce large shear and bending moment loads on the associated airframe structure, e.g., sealing means, latches and airframe openings. The imposed loads produce flexural motion which must be accommodated by the sealing means without degrading its principle function, i.e., to provide a water-tight seal between the egress panel and the bordering/supporting fuselage structure, i.e., panel frame. As such, manufacturing tolerances must be accurately held to ensure proper fit and function of the sealing means.

Prior art systems for providing emergency egress having included detachable egress panels which seat against a bulb seal for providing the requisite watertight seal. More specifically, the egress panel is retained by a pair of retention pins and a coupled pair of latching mechanisms for securing the upper and lower edges, respectively, of the panel. The upper pair of retention pins are affixed to the panel and seat within aperture fittings formed or secured in combination with the upper edge of the panel frame. The retention pins and aperture fittings are configured to provide lateral restraint of the panel while facilitating vertical insertion and removal of the panel. The latching mechanisms provide similar lateral restraint with respect to the lower edge of the panel and, additionally, produce a camming action which draws the panel into engagement with the bulb seal. To detach the panel in an emergency situation, the latching mechanisms, which are disposed in combination with a jettison handle, are disengaged such that a passenger/crewmember may urge the panel away from its supporting frame and cause the retention pins, and, consequently, the panel to vertically disengage from the aperture fittings under the force of gravity.

Shortcomings of this emergency egress system relate to the lack of water integrity and difficulties associated with manufacture and assembly. Regarding the former, it will be appreciated that flexural motion of the panel under the influence of external suction loads provides an opportunity for water infiltration. If, on the one hand, the camming action of the latching mechanism provides insufficient pre-compression of the bulb seal, flexure of the panel may cause separation therefrom and the opportunity for leaks to develop. If, on the other hand, the camming action produces a high level of precompression, the frictional forces produced by the latching mechanism may adversely affect the desired actuation loads for ease of jettison, i.e., the loads required to displace the jettison handle.

Regarding the latter, it will be appreciated that manufacturing tolerances must be accurately held and painstaking adjustments may be necessary to exact the proper dimensions for optimum seating of the panel against the bulb seal. Accordingly, the manufacture and assembly of such emergency egress systems is costly and subject to operator proficiency.

Other egress systems, typically used for small egress exits, employ a structurally reconfigurable weather strip disposed about the peripheral edges of the egress panel and associated panel frame. The weather strip provides lateral retention of the panel, produces a water-tight seal, and is structurally reconfigurable such that the panel may be detached in emergency situations when acted upon by a light load, i.e., a force provided by a passenger/crewmember. More specifically, the weather strip is composed of an elastomer material and includes back to back C- or U-shaped channels, which accept, in tongue-and-groove fashion, the peripheral edges of the panel and panel frame.

The weather strip also includes a V-shaped groove disposed on the exposed face of the weather strip and between the C- or U-shaped channels. The V-shaped groove facilitates installation and removal by permitting a degree of angular deflection of the elastomer weather strip. Upon installation, i.e., once the weather strip is properly positioned between the panel and panel frame, a correspondingly shaped filler strip is disposed within the V-shaped groove for, simultaneously, rigidizing the weather strip and pressing the channels into water-tight engagement with the respective panel and panel frame edges. Depending upon the size of the weather strip and the durometer of the elastomer employed in its construction, the weather strip may be sufficiently rigid to react the various loads acting on the panel.

In an emergency situation, the weather strip may be returned to its unsupported/flexible configuration by removing/pulling the filler strip from the V-shaped groove. More specifically, the filler strip includes an initiator tab at one end thereof which is accessible to a passenger/crewmember to facilitate the removal of the filler strip. In operation, the passenger/crewmember pulls the filler strip until the entire filler strip is removed, i.e., about the entire periphery of the panel. Having disengaged the filler strip, the passenger/crewmember may, with a relatively small force, i.e., about 30 lbs, separate the egress panel from the panel frame by pushing outwardly on the panel.

While this emergency egress system offers certain improvements, particularly in the area of sealing, the advantages thereof are limited to relatively small egress exits. Firstly, it will be appreciated that the relatively low shear modulus of the elastomer weather strip provides limited capability with respect to lateral retention. As suction loads increase, such as those developed on larger Type III panels, the weather strip is incapable of providing the requisite degree of lateral retention. Secondly, insofar as the length of the filler strip is proportional to the perimeter of the exit opening, the time expended for removal of the filler strip during emergency egress is should be reasonable, i.e., within two or three seconds, and the ergonomics associated therewith must be manageable, i.e., requiring no more than two or three hand-over-hand pulls. While these criteria are readily met for small hatch configurations, the larger Type III egress exits employ more than 9 feet (274 cm) of filler strip which, it will be appreciated, cannot be removed in an expeditious and manageable fashion. Furthermore, the lengthy filler strip may become a source of entanglement during egress.

A need, therefore, exists to provide an emergency egress system, particularly for large egress exits of multi-passenger aircraft, which positively secures the egress panel to its supporting panel frame, produces a water-tight seal therebetween, and facilitates rapid egress from the aircraft in an emergency situation.

SUMMARY OF THE INVENTION

It is an object of the present invention to provide an emergency egress system which positively secures an egress panel to a panel frame to react the various aerodynamic loads acting upon the egress panel.

It is another object of the present invention to provide such an emergency egress system which provides a simple and reliable mechanism to facilitate rapid egress of passengers/crewmembers during an emergency situation.

It is yet another object of the present invention to provide such an emergency egress system which provides a water-tight seal between the egress panel and panel frame.

It is yet a further object of the present invention to provide such an emergency egress system which obviates the requirement for precise manufacturing tolerances and/or the need for numerous assembly adjustments.

These and other objects are achieved by an emergency egress system for facilitating emergency egress of passengers/crewmembers from an aircraft, which egress system includes an egress panel, a panel frame disposed about the egress panel and a weather strip defining back-to-back channels for accepting the peripheral edges of the egress panel and the panel frame. Furthermore, the emergency egress system includes a plurality of retention devices disposed about the periphery of the egress panel for laterally retaining the egress panel with respect to the panel frame in a normal operating mode, a cam means operative to forcibly urge a portion of the weather strip out of engagement with one of the peripheral edges of the egress panel or panel frame, and an actuation means operative to sequentially disengage at least one of the retention devices and actuate the cam means in an emergency operating mode. Following actuation, a passenger/crewmember may forcibly detach the egress panel from the panel frame.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIG. 5 is a partially broken-away perspective view of the lower portion of the emergency egress system including a pair of interactive retention devices, an actuation means, and a cam means wherein the actuation means is partially exploded for revealing the various elements thereof;

FIG. 6 is a cross-sectional view taken substantially along line 6—6 of FIG. 5 depicting a top view of a cam member disposed in combination with a jettison lever of the actuation means;

BEST MODE FOR CARRYING OUT THE INVENTION

Figure 1:
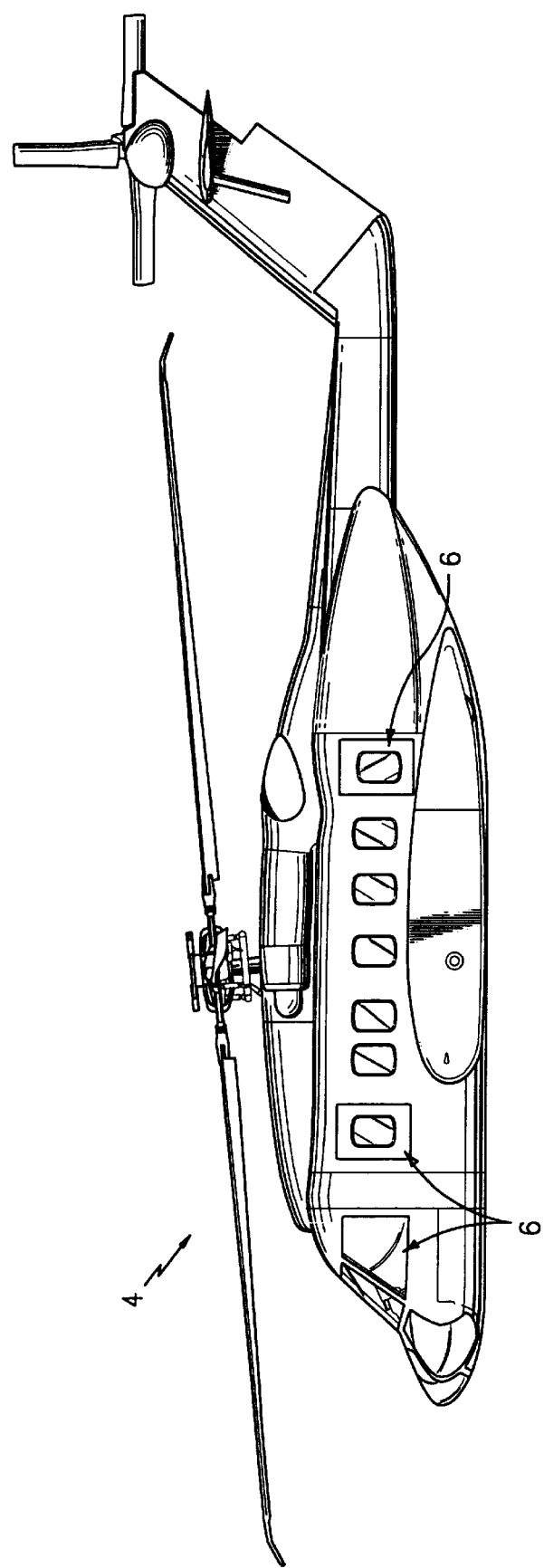
FIG. 1 is a profile view of a multi-passenger transport helicopter for depicting the location of various emergency egress exits.

Referring now to the drawings wherein like reference characters identify corresponding or similar elements throughout the several views, FIG. 1 shows a profile view of a multi-passenger Sikorsky S-92® helicopter 4 and the location of various emergency egress exits 6 required under Federal Aviation Administration (FAA) regulations. These egress exits 6 are of the Type III variety which, as discussed in the Background of the Invention, are appropriately sized to facilitate rapid egress of passengers/crewmembers in the event of an emergency situation. While the invention disclosed herein is applicable to emergency egress systems of varying sizes, styles and shapes, the teachings are most efficacious for those employing large egress panels wherein the problems of panel retention and water infiltration are exacerbated by large suction airloads.

Figure 2:
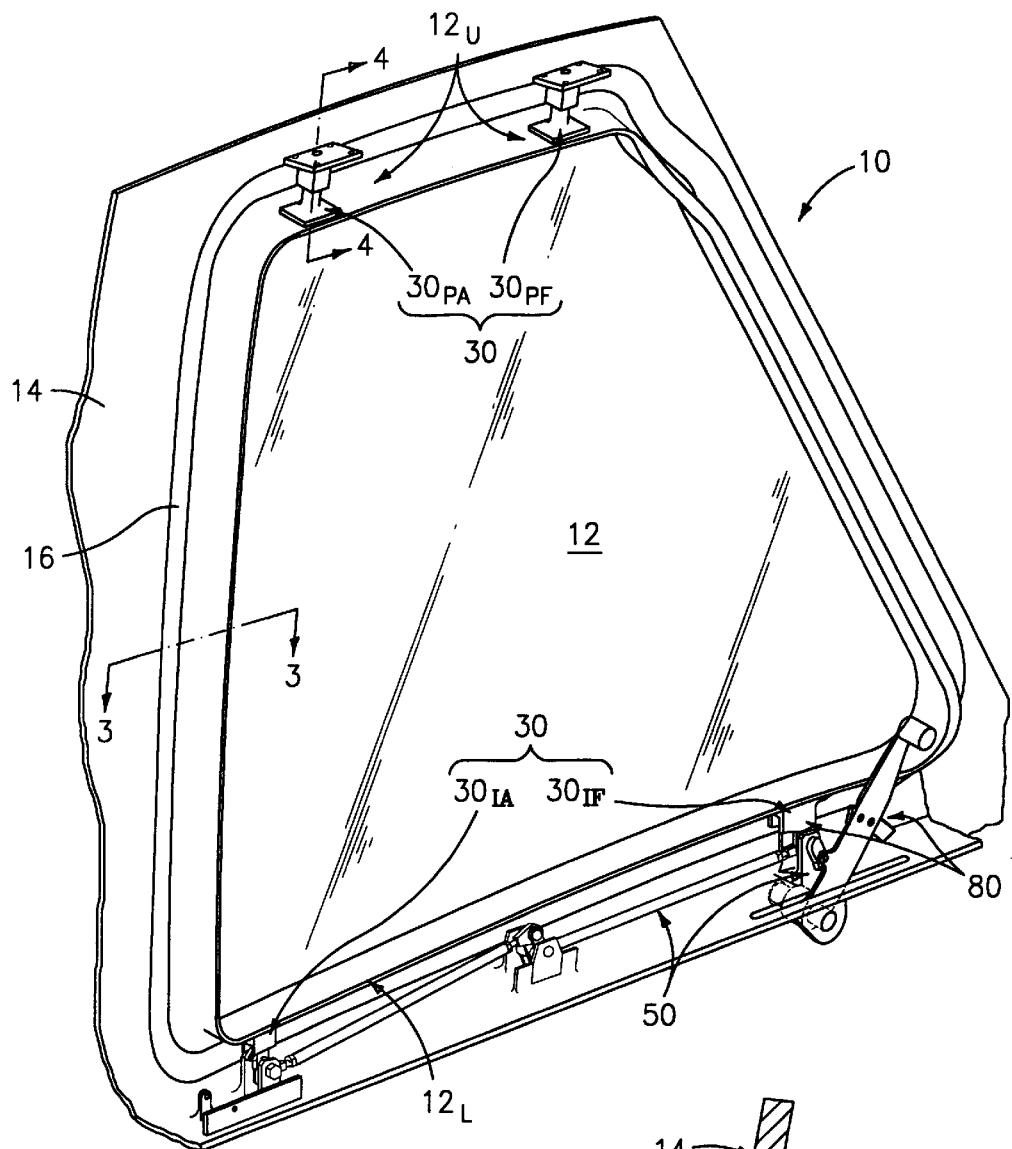
FIG. 2 depicts an isolated perspective view of the emergency egress system including an egress panel bordered and supported by a panel frame.

In FIG. 2, an emergency egress system 10 according to the present invention is shown in isolated perspective from within the cockpit, i.e., an outwardly looking view from the perspective of a pilot/copilot. The emergency egress system 10 includes an egress panel 12, i.e., a cockpit window, bordered and supported by a panel frame 14, a weather strip 16 disposed between the egress panel 12 and the panel frame 14, a plurality of retention devices 30 operative to alternately retain and decouple the egress panel 12 with respect to panel frame 14, a cam means 80 operative to forcibly disengage a portion of the weather strip 16, and an actuation means 50 operative to sequentially disengage at least one of the retention devices 30 and actuate the cam means 80. The operation and import of each system component will be described in subsequent paragraphs.

Figure 3:
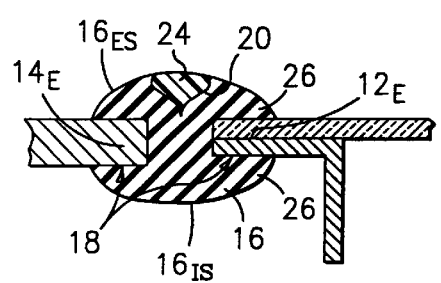
FIG. 3 is a cross-sectional view taken substantially along line 3—3 of FIG. 2 depicting a weather strip disposed in combination with peripheral edges of the egress panel and panel frame.

In FIGS. 2 and 3, the egress panel 12 and panel frame 14 define peripheral edges $12_E$ and $14_E$, respectively, which engage back-to-back C- or U-shaped channels 18 defined by the weather strip 16. The weather strip 16 is composed of a flexible elastomer and includes a V-shaped groove 20 disposed between the channels 18 and about one of the face surfaces $16_{IS}$, $16_{ES}$ of the weather strip 16. The V-shaped groove 20 produces an effective hinge which facilitates installation and removal of the weather strip 16. Upon installation, a correspondingly shaped filler strip 24 is inserted within the V-shaped groove 20 thereby rigidizing the weather strip 16 and pressing the opposed flanges 26 thereof into water-tight engagement with the peripheral edges $12_E$, $14_E$ of the egress panel 12 and panel frame 14. Insofar as the emergency egress system 10 of the present invention does not rely upon the filler strip 24 for deployment of the egress panel 12, the filler strip 24 may be disposed on either of the face surfaces $16_{IS}$, $16_{ES}$ of the weather strip 16. In the preferred embodiment, the filler strip 24 is disposed on the exterior surface $16_{ES}$ of the weather strip 16 to facilitate installation and removal of the egress panel 12.

While the weather strip 16 may be press fit between the peripheral edges $12_E$, $14_E$ of the egress panel 12 and panel frame 14, the weather strip 16 is preferably adhesively bonded to the peripheral edge $14_E$ of the panel frame 14 to ensure that the weather strip 16 remains attached thereto during egress operations (discussed in greater detail hereinbelow). That is, by affixing the weather strip 16 to the panel frame 14, the weather strip 16 will not become a source of entanglement and will provide a protective sheath over potentially rough edges of the panel frame 14.

The weather strip 16 functions to provide a water-tight seal between the panel 12 and panel frame 14 and, additionally, provides the necessary in-plane support of the egress panel 12, i.e., vertical and horizontal support. As discussed in the Background of the Invention, lateral support of the egress panel 12 is limited by the relatively low shear modulus of the elastomer weather strip 16. In view of this limitation, each retention device 30 (see FIG. 2) provides positive lateral restraint of the egress panel 12 with respect to its supporting panel frame 14.

Figure 4:
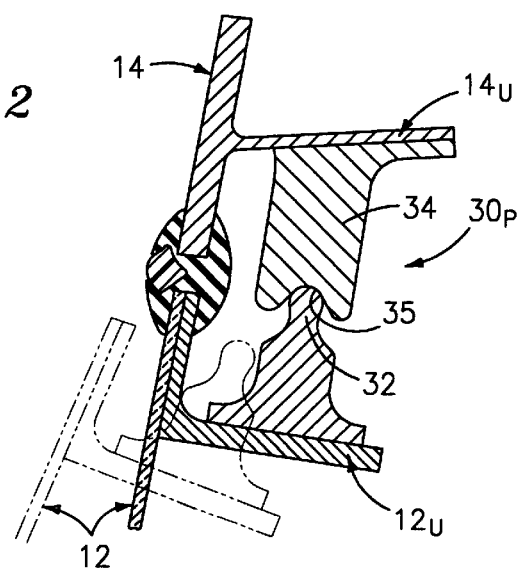
FIG. 4 is a cross-sectional view taken substantially along line 4—4 of FIG. 2 depicting passive retention devices disposed along the upper portion of the egress panel.

More specifically, the retention devices 30 are disposed about the periphery of the egress panel 12 and, in the preferred embodiment, are disposed about the upper and lower portions $12_U$, $12_L$ of the egress panel 12. While any number and variety of conventional retention devices may be employed, e.g., pins, shear pins, dowels, latches etc., the preferred embodiment includes a pair of passive retention devices $30_{PA}$, $30_{PF}$, disposed along the upper portion $12_U$ of the egress panel 12 and a pair of interactive retention devices $30_{IA}$, $30_{IF}$, disposed along the lower portion $12_L$ of the egress panel 12. In FIG. 4, each of the passive retention devices $30_{PA}$, $30_{PF}$ includes a retention pin 32 secured in combination with the upper portion $12_U$ of the egress panel 12 and a fitting 34 disposed in combination with the upper portion $14_U$ of the panel frame 14, which fitting 34 defines an aperture 35 for accepting and capturing the retention pin 32. Furthermore, the pin 32 and aperture 35 are configured to react lateral loads, such as those imposed by aerodynamic forces, and facilitate vertical engagement and disengagement of the retention pin 32 when the panel 12 is disposed at a predetermined angle (shown in phantom) with respect to the panel frame 14. As will become apparent when discussing the operation of the emergency egress system 10, the predetermined angle of the panel 12 will be effected by passengers/crewmembers during an emergency operating mode.

In FIG. 5, each of the interactive retention devices $30_{IA}$, $30_{IF}$ includes a latch member 36 disposed in pivotal combination with a pair of lug fittings 38 and a retention block 40 having a slot 42 formed therein for accepting the upper portion of the latch member 36. The lug fittings 38 are disposed in combination with a lower side sill portion $14_{SS}$ of the panel frame 14 and the retention block 40 is disposed in combination with the lower portion $12_L$ of the egress panel 12. Accordingly, the latch member 36 may be pivotably displaced so as to alternately engage and disengage the slot 42, thereby alternately providing lateral restraint of egress panel 12 or decoupling the egress panel 12 from its supporting panel frame 14.

Thusfar in the discussion, the emergency egress system 10 has been described in terms of its normal operating condition or mode wherein the weather strip 16 is engaged and the retention devices 30 provide lateral restraint of the egress panel 12. The following describes the various components of the egress system 10 in an emergency operating mode wherein the actuation means 50 sequentially decouples the at least one of the retention devices 30 and actuates the cam means 80 which is operative to forcibly disengage a portion of the weather strip 16.

Before discussing the kinematic operation of the emergency egress system 10, a brief description of the actuation means 50 and cam means 80 is provided. In FIG. 5, the actuation means 50 comprises a jettison lever 52 pivotally mounting to the side sill $14_{SS}$ of the panel frame 14 via a lug fitting 54, an actuation fork 56 defining a slot 58, a drive pin 60 disposed in combination with the jettison lever 52 and the slot 58, a connecting shaft 62 disposed in combination with the actuation fork 56 and the latch member 36 of the forward interactive retention device $30_{IF}$, and an intermediate linkage arrangement 70 which operationally couples the latch members 36 of the forward and aft interactive retention devices $30_{IA}$, $30_{IF}$. More specifically, the drive pin 60 engages the slot 58 of the actuation fork 56 and is operative to rotate the actuation fork 56 in response to rotation of the jettison lever 52. Furthermore, the connecting shaft 62 is operative to pivotally mount the latch member 36 to the respective lug fittings 38 and to transfer rotational motion of the actuation fork 56 to the latch member 36.

The intermediate linkage arrangement 70 is operative to couple the latch members 36 such that rotational motion of one to the latch members 36 is conveyed to the remaining other. In the described embodiment, the linkage arrangement 70 includes a pair of tandemly arranged push-pull rods 72, and an idler assembly 74 having an idler arm 76 pivotally mounting about its longitudinal center to a pair of central lug fittings 78. Each of the push-pull rods 72 is pivotally mounted, at one end thereof, to one of the latch members 36 and, at the other end thereof, to the idler arm 76. As such, the linkage arrangement 70 interconnects the latch members 36 such that clockwise rotation of one of the latch members 36 effects counterclockwise rotation of the remaining other.

In FIGS. 5 and 6, the cam means 80 comprises a cam member 82 disposed in combination with the jettison lever 52 and a cam reaction surface 84 disposed in combination with the egress panel 12. More specifically, the cam member 82 defines a ramped surface 86 (FIG. 6) which may be caused to interact with the cam reaction surface 84 in response to rotation of the jettison lever 52. In the described embodiment, the cam member 82 is directly mounted to an outwardly facing surface $52_S$ of the jettison lever 52 and the cam reaction surface 84 is integrally formed in combination with and defined by the retention block 40 of the forward interactive retention device $30_{IF}$.

Figure 7A:
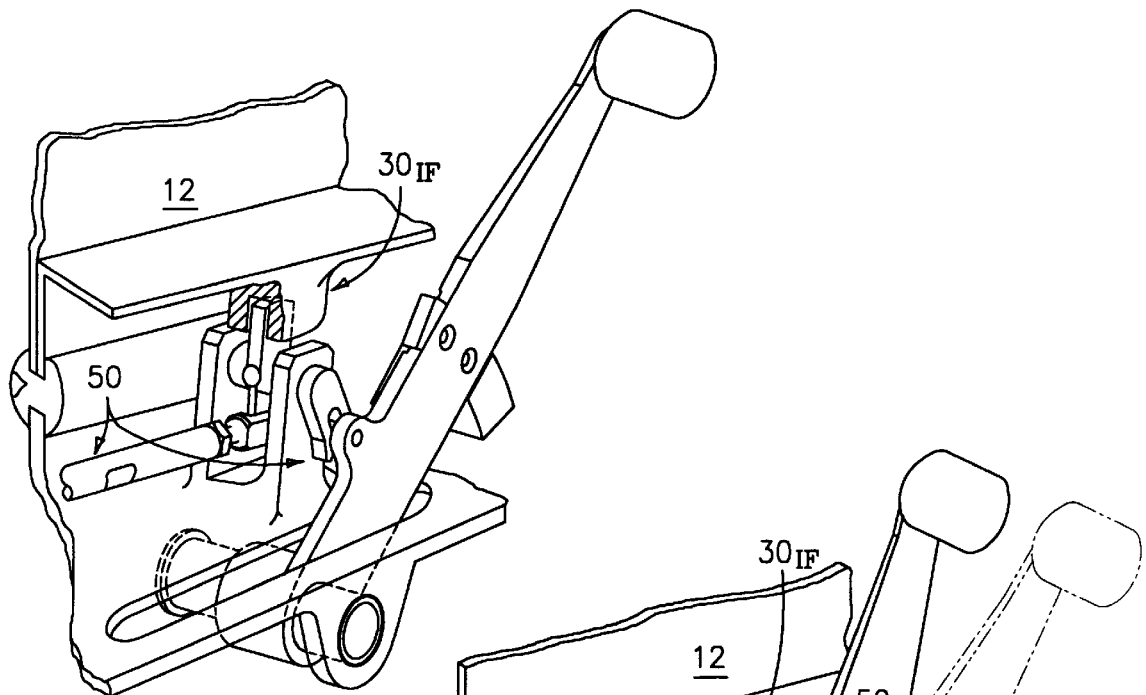
FIG. 7a–7c depict enlarged perspective views of the actuation means and the kinematic operation thereof through first, second and third operating positions.
Figure 7B:
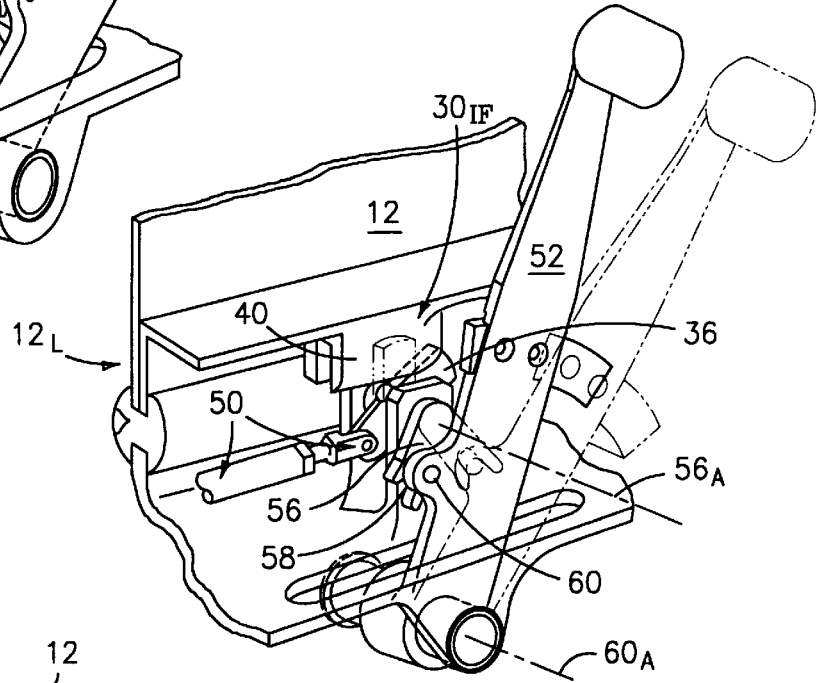
Figure 7C:
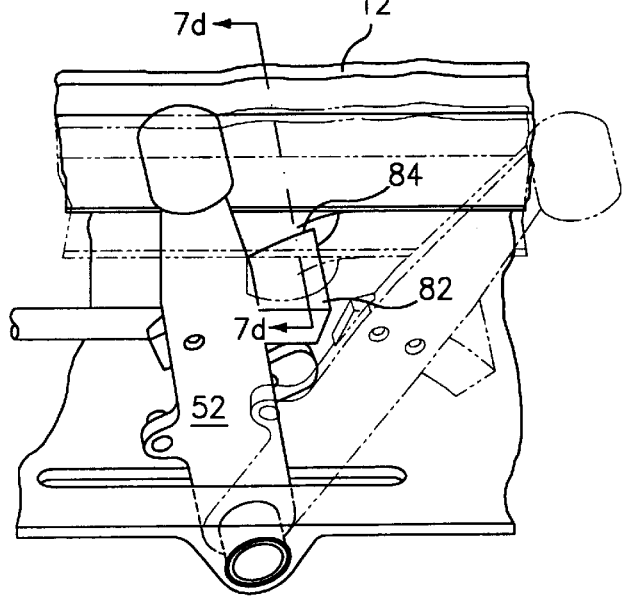

In FIGS. 7a–7c, the kinematic operation of the emergency egress system 10 is shown wherein the actuation means 50 defines first, second and third operating positions. In FIG. 7a, the first operating position corresponds to the normal operating mode wherein the interactive retention devices $30_{IA}$, $30_{IF}$ are engaged to positively retain the egress panel 12. In FIGS. 7b–7c, the second and third operating positions correspond to the emergency operating mode wherein the interactive retention devices $30_{IA}$, $30_{IF}$ are disengaged and the cam means 80 is actuated.

More specifically, in FIG. 7b, the jettison lever 52 is transpositioned, i.e., rotated via a passenger/crewmember, from the first operating position (shown in phantom) to the second operating position such that the actuation fork 56 is rotated in an opposite direction via the slotted engagement thereof with the drive pin 60. Insofar as rotational axis $60_A$ of the drive pin 60 is non-coincident with the rotational axis $56_A$ of the actuation fork 56, the slot 58 thereof accommodates foreshortening motion therebetween, i.e., linear motion between the drive pin 60 and the actuation fork 56. The rotation of the actuation fork 56 effects rotation of the latch members 36 via the connecting shaft 62 (see FIG. 5) and intermediate linkage arrangement 70. In the second position, such rotation is sufficient to fully disengage the latch members 36 from the respective retention blocks 40 and release the lower portion $12_L$ of the egress panel 12.

Figure 7D:
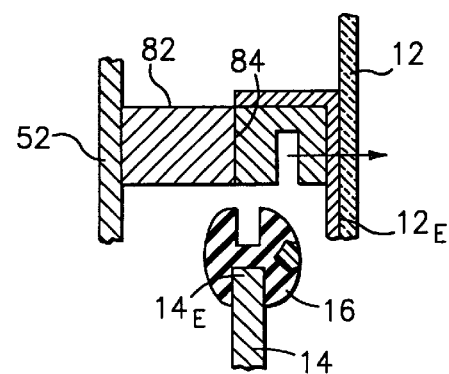
FIG. 7d is a cross-sectional view taken substantially along line 7d—7d of FIG. 7c depicting the operation of the cam means in the third operating position of the actuation means.

In FIGS. 7c and 7d, the jettison lever 52 is rotated from the second operating position (shown in phantom in FIG. 7c) to the third operating position such that the cam member 82 engages the cam reaction surface 84 to outwardly displace the egress panel 12. The cam means 80 must effect sufficient lateral displacement to fully disengage a portion of the weather strip 16 (FIG. 7d) from one of the peripheral edges $12_E$, $14_E$ of either the egress panel 12 or the panel frame 14.

Having dislodged a portion of the weather strip 16, the passenger/crewmember may, with relatively little effort or force applied to the egress panel 12 (approximately 30 lbs of applied load), cause the remainder of the weather strip 16 to separate from the egress panel 12 or panel frame 14. When the egress panel 12 has been sufficiently displaced outwardly to a predetermined angle, as shown in FIG. 3, the passive retention devices 30 disengage such that the egress panel 12 may, under the force of gravity, fully detach from the panel frame 14.

In the preferred embodiment, it is desirable to locate the cam means 80 proximal to the corner $12_C$ (FIG. 5) of the egress panel 12 such that the weather strip 16 is dislodged along adjoining sides $12_L$, $12_F$ of the egress panel 12. Such positioning of the cam means 80 and resultant disengagement of the weather strip 16 facilitates a shearing action along the periphery of the egress panel 12 when a load is applied in the vicinity of the corner $12_C$. As such, a minimum force is required by the passenger/crewmember to dislodge the remaining portions of the weather strip 16.

The emergency egress system 10 has been shown and described with respect to an exemplary embodiment thereof, though it should be understood by those skilled in the art that the foregoing and other changes, omissions and additions may be made thereto without departing from the spirit and scope of the present invention. The following paragraphs describe various alternate embodiments of the emergency egress system 10.

Referring collectively to FIGS. 2–5, it will be appreciated that while the weather strip 16 is configured to accept a V-shaper filler strip 24 to facilitate installation, the configuration of the weather strip 16 and/or the installation method may vary depending upon the specific application. Furthermore, while a pair of passive and interactive retention devices 30 are employed to retain the egress panel 12 in the normal operating mode, it will be appreciated that any number of retention devices 30 may be used provided that at least one of the retention devices 30 may be interactively disengaged by the actuation means 50.

While the egress panel 12 and panel frame 14 are depicted and/or described as including, for example, structural flanges, lug fittings, and a side sill, it will be appreciated that any structure capable of performing the requisite function may be substituted therefor while remaining within the spirit and scope of the invention. Furthermore, in the broadest sense of the invention, the egress panel 12 may include any deployable structure such as a window, hatch, or door, and the panel frame 14 may include any rigid airframe structure surrounding the egress panel 12.

While the actuation means 50 described above comprises a mechanical linkage, e.g., the slotted actuation fork 56, connecting shaft 62, and intermediate linkage arrangement 70, it will be appreciated that other mechanical, electrical or hydraulic actuation devices may be employed for disengaging one or more of the interactive retention devices 30. Furthermore, while the actuation means 50 is disposed in combination with the panel frame 14, it will be appreciated that the actuation means may, alternatively, be disposed in combination with the egress panel. When employing such arrangement, modifications will be made to one or more of the interactive retention devices and the cam means to reverse the placement and connection of the interacting components, e.g., mounting the latch members to the egress panel and the retention blocks to the panel frame. An example, of such actuation means 50 is described below in an alternate embodiment of the invention.

While the jettison lever 52 and the retention block 40 provide a convenient and efficient mounting location for the cam means 80, it will be appreciated that any camming device may be employed for forcibly urging a portion of the weather strip out of engagement with respect to the egress panel or panel frame. For example, a cam member may be slidably mounted within a channel formed in combination with the panel frame and actuated, i.e., pulled toward a reaction surface, by means of a simple link or cable which is secured in combination with a jettison lever. Furthermore, the reaction surface need not be integrated with a retention block and may be independent and distinct therefrom.

Figure 8A:
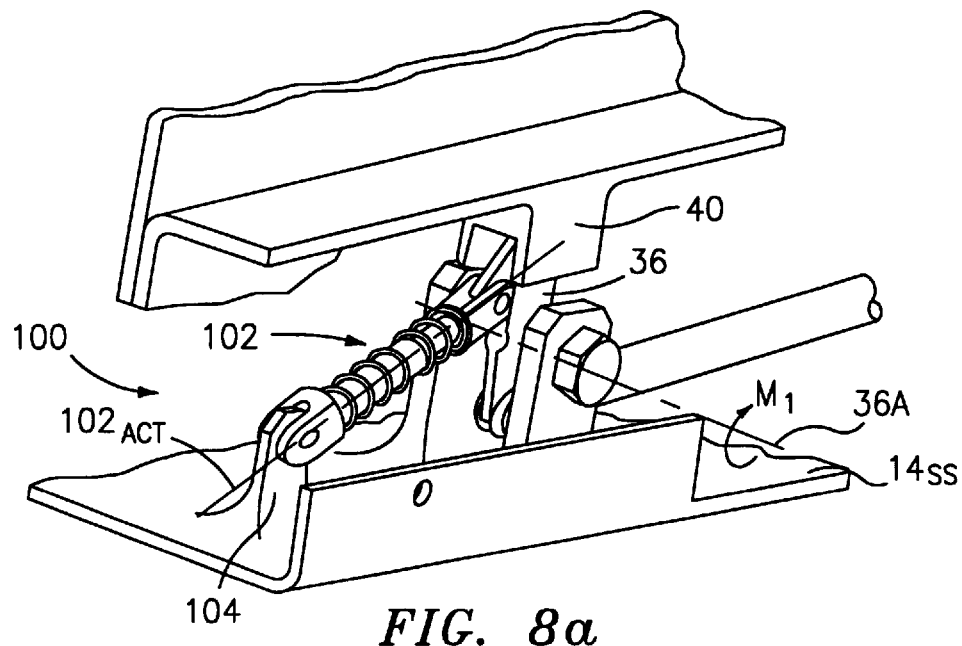
FIGS. 8a and 8b depict perspective views of an alternate embodiment of the invention wherein a spring loaded over-center device is provided for ensuring that the egress panel remains disengaged and the actuation means is in a non-obstructing position during egress operations.
Figure 8B:
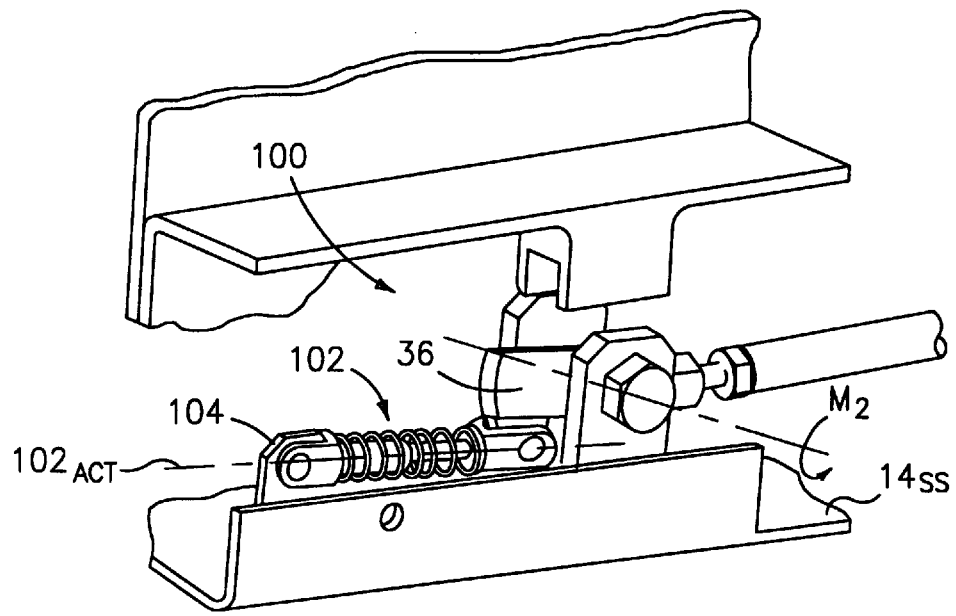

In FIGS. 8a and 8b, an alternative embodiment of the emergency egress system is shown wherein a spring biased overcenter device 100 may be employed for ensuring that the latch members 36 remain disengaged and preventing counterrotation of the jettison lever (not shown in FIGS. 8a and 8b) following actuation of the emergency egress system. More specifically, in the described embodiment, the overcenter device 100 includes a biasing mechanism 102 which is disposed between and in pivotal combination with the aft latch member 36 and with a lug fitting 104 which is secured in combination with the side sill $14_{SS}$ portion of the panel frame 14. In FIG. 8a, the line of action $102_{ACT}$ of the biasing mechanism 102 effects a moment $M_1$ about the rotational axis $36_A$ of the latch member 36 in a direction tending to bias the latch member 36 into engagement with the retention block 40. In FIG. 8b, the line of action $102_{ACT}$ of the biasing mechanism 102 effects a moment $M_2$ tending to bias the latch member 36 out of engagement with the retention block 40 and retaining the position of the various elements, e.g., the intermediate linkage, actuation fork and jettison lever, of the actuation means. Accordingly, the overcenter device 100 ensures that the egress panel remains disengaged and the jettison lever is disposed in a non-obstructing position during egress operations.

Figure 9:
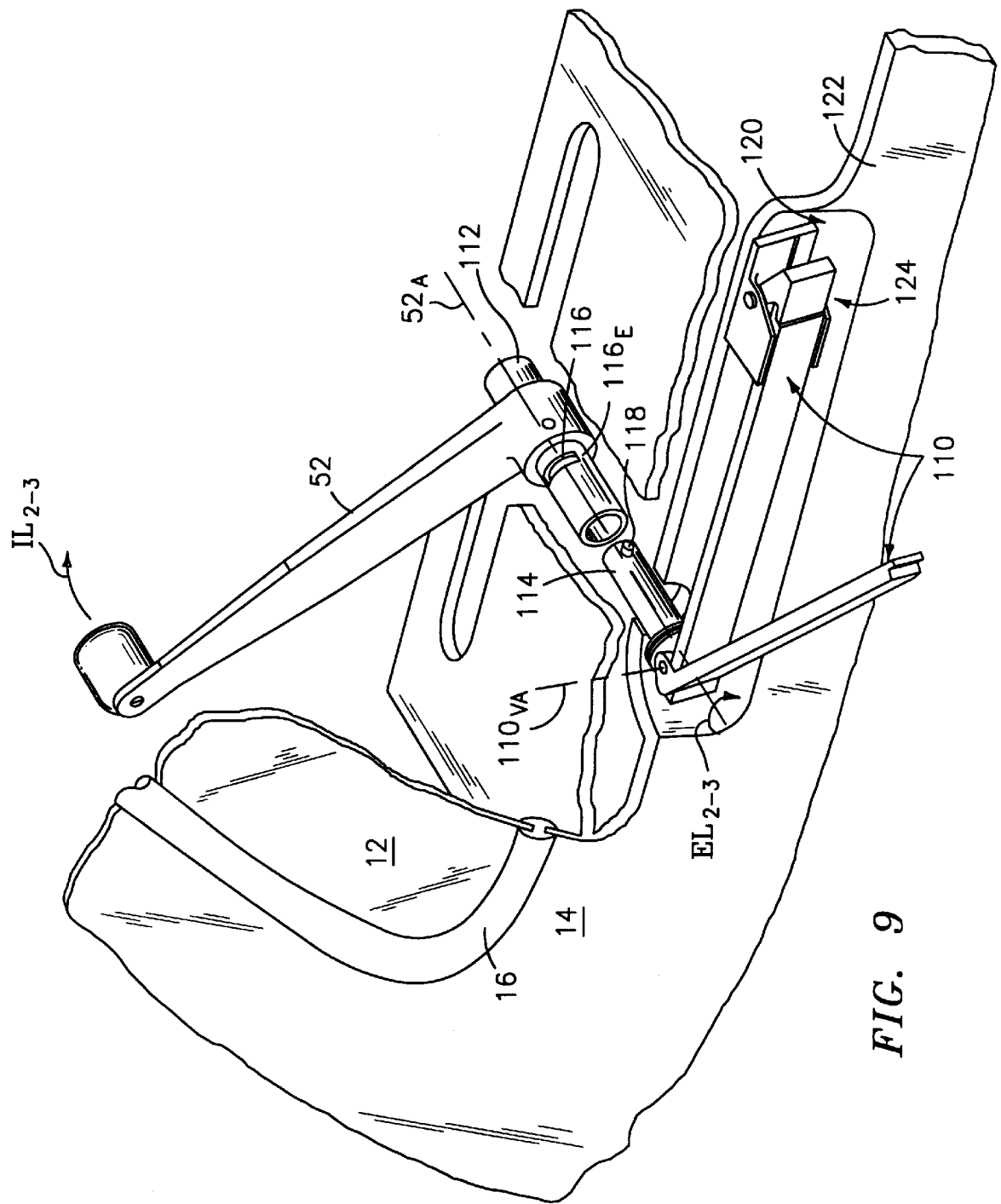
FIG. 9 depicts a partially broken-away external perspective view of an alternate embodiment of the invention wherein an external jettison lever is disposed in combination with the internal jettison lever of the actuation means, which external jettison lever facilitates actuation of the emergency egress system from the exterior of the aircraft.

In FIG. 9, yet another embodiment of the emergency egress 10 is depicted wherein an external jettison lever 110 is disposed in combination with the internal jettison lever 52 such that the egress panel 12 may be opened/deployed from the exterior of the aircraft. This feature, which is yet another requirement of the FAA, is desirable to assist those in a rescue effort to come to the aid of incapacitated passengers/crewmembers. Various elements of the egress system 10 have been deleted, e.g., the cam means, the interactive retention devices, etc., to facilitate illustration and description.

In this embodiment of the invention, a first shaft 112 is disposed in combination with the internal jettison lever 52 and a second shaft 114 is disposed in combination with the external jettison lever 110. The first and second shafts 112, 114 are coaxially aligned with each other and with the rotational axis $52_A$ of the internal jettison lever 52 such that the external jettison lever 110 may coact therewith. The first shaft 112 defines an arcuate slot 116 for accepting a drive pin 118 which is disposed in combination with the second shaft 114. Furthermore, when the internal jettison lever 52 is disposed in the first operating position, i.e., corresponding to the ready position, the drive pin 118 is proximal to an end $116_E$ of the arcuate slot 116. Moreover, the external jettison lever 110 is disposed within a recessed portion 120 of the external airframe structure 122 and is held in position, i.e., rotationally fixed, by means of a spring loaded latch mechanism 124.

In operation, the internal jettison lever 52 may be rotated through the second and third operating positions, i.e., in the direction of the arrow $IL_{2-3}$, such that the drive pin 118 slides freely relative to the arcuate slot 116. That, is the jettison lever 52 may be actuated internally without being restricted by the external jettison lever 110. To actuate the emergency egress system 10 from the exterior of the aircraft, the spring loaded latch mechanism 124 is released, thereby permitting rotation of the external jettison lever 10 in the direction of arrow $EL_{2-3}$. As such, the drive pin 118 engages the end $116_E$ of the arcuate slot 116 to drive the internal jettison lever 52 through its operating positions.

In the described embodiment, the external jettison lever 110 is pivotably mounted to the second shaft 114 about a vertical axis $110_{VA}$ such that the external jettison lever 110 may be rotated away from the recess 120, thereby avoiding contact with the external airframe 122. In other embodiments, it will be appreciated that the recess 120 may be configured, i.e., enlarged, to accommodate rotation of the jettison lever 110 without the requirement for such pivot mount.

Figure 10A:
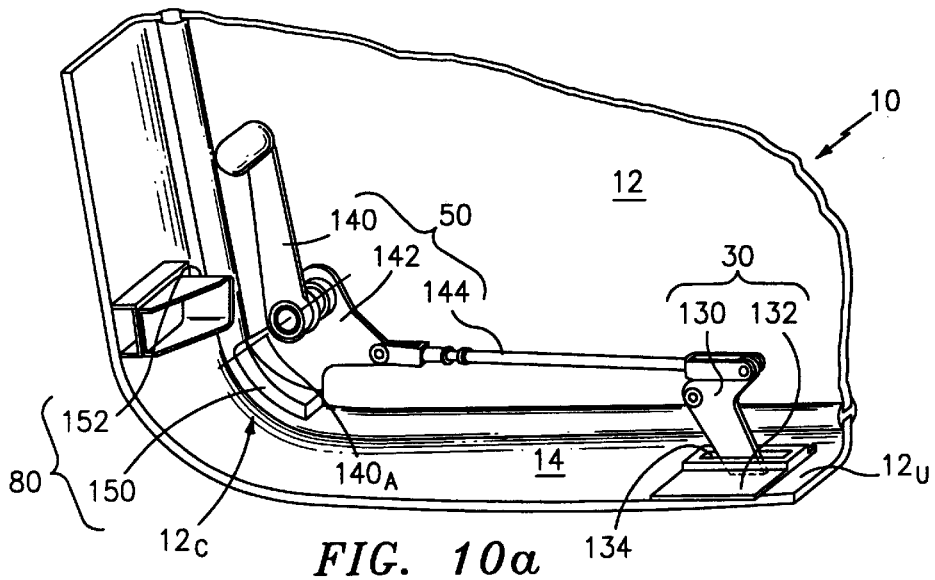
FIGS. 10a–10c depict perspective views of an alternate embodiment of the invention wherein the actuation means is disposed in combination with the egress panel.
Figure 10B:
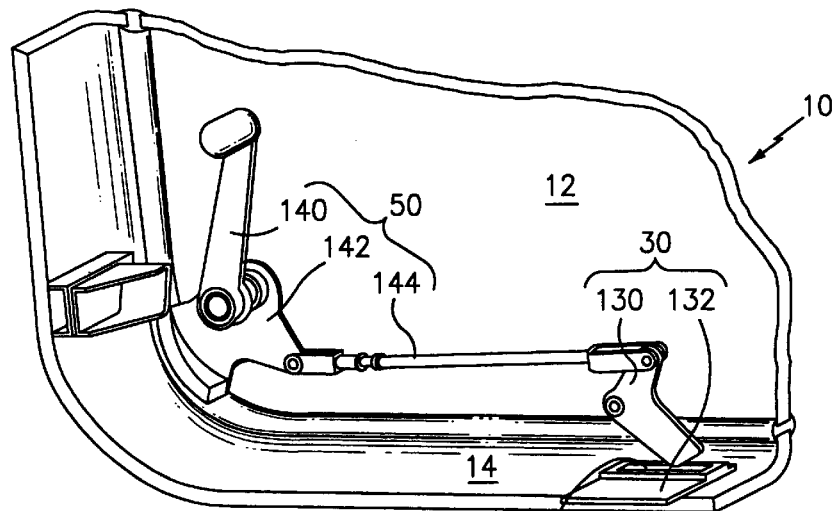
Figure 10C:
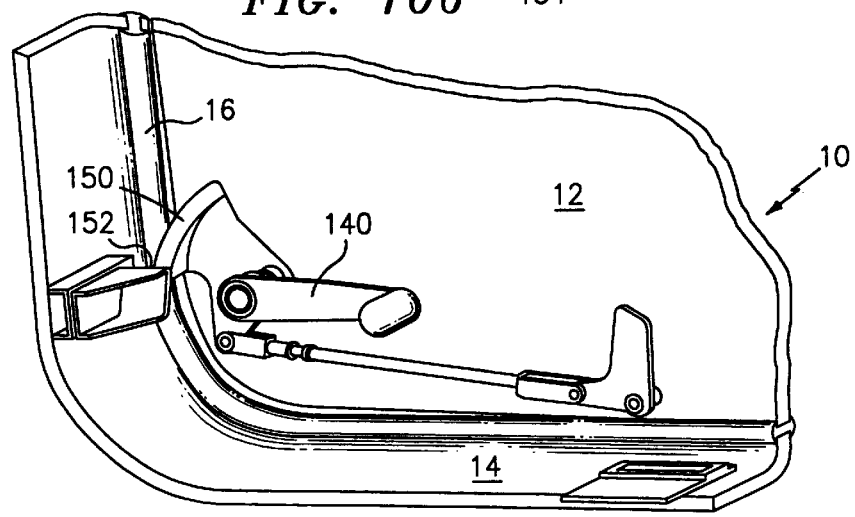

In FIGS. 10a–10c yet another embodiment of the emergency egress system 10 is depicted wherein the actuation means 50 is disposed in combination with the egress panel 12 and wherein other elements such as the interactive retention device 30 and cam means 80 have been modified to reverse the placement and connection of the constituent elements. More specifically, in FIG. 10a, the interactive retention device 30 includes a latch member 130 disposed in pivotal combination with the egress panel 12, and a retention fitting 132 disposed in combination with the panel frame 14. The actuation means 50 includes a jettison lever 140 pivotally mounting to the egress panel 12 about an axis of rotation $140_A$, a drive plate 142 disposed in combination with the jettison lever 140 and operative for being driven about the rotational axis $140_A$ in response to rotation of the jettison lever 140, and a pull rod 144 disposed in combination with the drive plate 142 and the latch member 130 for transferring rotational motion of the drive plate 142 to the latch member 130. The cam means 80 includes a cam member 150 disposed in combination with the drive plate 142, and a cam reaction surface 152 disposed in combination with the panel frame 14. As mentioned earlier, the cam means 80 is preferably disposed proximal to a corner $12_C$ of the egress panel for reducing the force required by a passenger/crewmember to deploy the egress panel 12.

In FIG. 10a, the emergency egress system 10 is shown in the normal operating position wherein the jettison lever 140 is disposed in a first position and the latch member 130 is engaged with a slot 134 defined by the retention fitting 132. The interactive retention device 30, therefore, retains the lower portion $12_U$ of the egress panel 12 and a passive retention device (not shown) similar to that already described retains the upper portion of the egress panel 12.

In FIG. 10b, the jettison lever 140 is rotated from the first operating position to a second operating position wherein the drive plate 142 and pull rod 144, in combination, effect rotation of the latch member 130 sufficient to disengage the latch member 130 from the slot 134. In FIG. 10c, the jettison lever 140 is rotated to a third operating position wherein the cam member 150 is caused to engage the cam reaction surface 152 to laterally displace the egress panel 12 outwardly, thereby forcibly urging a portion of the weather strip 16 out of engagement with the egress panel 12 or panel frame 14. The remaining egress operations, i.e., disengagement of the egress panel 12 by the passenger/crewmember, are the same as those already described.

In summary, the emergency egress system employs a weather strip 16 which provides an improved watertight seal and a plurality of retention devices 30 which provide positive lateral restraint of the egress panel. While the prior art egress systems require interaction of the retention means and the bulb seal to effect a watertight seal, the emergency egress system 10 of the present invention provides a retention scheme, i.e., retention devices 30, which is separate and distinct from the sealing means, i.e., weather strip 16. Accordingly, the requirement for precise manufacturing tolerances and/or the need for numerous assembly adjustments are obviated by the present invention. Furthermore, the egress system 10 provides a simple and reliable mechanism, i.e., the actuation means 50 in combination with the cam means 80 and at least one of the retention devices 30, to facilitate rapid egress in an emergency situation. That is, while the prior art systems require the extraction of a filler strip and the attendant disadvantages associated therewith, the present invention initiates deployment of the egress panel 12 via a single actuation step, i.e., rotation of the jettison lever 52.

What is claimed is:

1. An emergency egress system (1) for facilitating emergency egress of passengers/crewmembers from an aircraft (4), comprising:

an egress panel (12) defining a peripheral edge (12$_E$);

a panel frame (14) disposed about said egress panel (12) and defining a peripheral edge (14$_E$);

a weather strip (16) defining back-to-back channels (18), said channels (18) engaging said peripheral edges (12$_E$, 14$_E$) of said egress panel (12) and said panel frame (14) with said peripheral edges (12$_E$, 14$_E$) of said egress panel (12) and said panel frame (14) each being received within a respective one of said back-to-back channels (18), said weather strip (16), furthermore, providing in-plane support of said egress panel (12) relative to said panel frame (14) in a normal operating mode;

a plurality of retention devices (30) disposed about the periphery of said egress panel (12) for laterally retaining said egress panel (12) with respect to said panel frame (14) in said normal operating mode;

cam means (80) operative to sequentially disengage, firstly, at least one of said retention devices (30) and actuate, secondly, said cam means (80) such that said at least one of said retention devices is released before camming action begins, in an emergency operating mode;

whereby, following actuation, a passenger/crewmember may detach said egress panel (12) from said panel frame (14).

2. The emergency egress system (10) according to claim 1 wherein said cam means (80) includes:

a cam member (82) disposed in combination with said actuation means (50) and defining a ramped surface (86); and a cam reaction surface (84) disposed in combination with said egress panel (12);

wherein said ramped surface (86) of said cam member (82) engages said cam reaction surface (84) to effect disengagement of said weather strip (16).

3. The emergency egress system (10) according to claim 1 wherein said cam means (80) is disposed proximal to a corner (12$_C$) of said egress panel (12).

4. The emergency egress system (10) according to claim 1 wherein said retention devices (30) include at least one passive retention device (30$_{PA}$ or 30$_{PF}$) and a pair of interactive retention devices (30$_{IA}$, 30$_{IF}$) disposed about said upper and lower portions (12$_U$, 12$_L$), respectively, of said egress panel (12) and panel frame (14), said pair including a forward interactive retention device (30$_{IF}$) and an aft interactive retention device (30$_{IA}$);

said at least one passive retention device (30$_{PA}$ or 30$_{PF}$) including:

a retention pin (32) secured in combination with said egress panel (12);

a fitting (34) disposed in combination with said panel frame (14) and defining an aperture (35) for accepting said retention pin (32) and for providing lateral retention thereof in said normal operating mode;

said aperture (35) being configured to facilitate vertical disengagement of said retention pin (32) when said panel (12) is disposed at a predetermined angle with respect to said panel frame (14), said predetermined angle being effected by the passenger/crewmember in said emergency operating mode;

each of said interactive retention devices (30$_{IA}$, 30$_{IF}$) including:

a retention block (40) disposed in combination with said egress panel (12), said retention block defining a slot (42); and a latch member (36) disposed in pivotal combination with said panel frame (14) and in combination with said actuation means (50) for alternately engaging and disengaging said slot (42) of said retention block (40) in said normal and emergency operating modes, respectively.

5. The emergency egress system according to claim 4 wherein said actuation means (50) includes:

a jettison lever (52) pivotally mounting to said panel frame and defining first, second and third operating positions about an axis of rotation rotational axis (52$_A$);

an actuation fork (56) operative for rotation about an axis (56$_A$) and defining a slot (58);

a drive pin (60) disposed in combination with and driven by said jettison lever (52) about said rotational axis (52$_A$), said drive pin (60), furthermore, engaging said slot (58) for effecting rotation of said actuation fork (56) about said axis (56$_A$) in response to rotation of said jettison lever (52);

a connecting shaft (62) disposed in combination with said actuation fork (56) and said latch member (36) of said forward interactive retention device (30$_{IF}$), said connecting shaft (62), furthermore, being operative to transfer rotational motion of said actuation fork (56) to said latch member (36); and an intermediate linkage arrangement (70) operative to couple said latch members (36) of said forward and aft interactive retention devices (30$_{IA}$, 30$_{IF}$) such that rotation motion of one of said latch members (36) is conveyed to the other of said latch members (36);

wherein said latch members (36) are engaged with said retention blocks (40) in said first operating position;

wherein said jettison lever (52) is rotated from said first to said second operating positions to disengage said latch members (36) from said retention blocks (40); and wherein said jettison lever (52) is rotated from said second to said third operating positions to actuate said cam means (80).

6. The emergency egress system (10) according to claim 5 wherein said cam member (82) is mounted to an outwardly facing surface (52$_S$) of said jettison lever (52) and said cam reaction surface (84) is integrally formed in combination with said retention block (40) of said forward interactive retention device (30$_{IF}$).

7. The emergency egress system (10) according to claim 5 wherein said intermediate linkage arrangement includes:

a pair of tandemly arranged push-pull rods (72);

an idler assembly (74) having an idler arm (76) pivotally mounting to said panel frame (14);

each of said push-pull rods (72) being pivotally mounting at one end thereof to one of said latch members (36) and, at the other end thereof, to said idler arm (76).

8. The emergency egress system (10) according to claim 5 further comprising:

a spring bias overcenter device (100) for biasing said latch members (36) out of engagement with respect to said retention blocks (40) and for preventing counter-rotation of said jettison lever (52) following rotation thereof through said operating positions.

9. The emergency egress system (10) according to claim 5 further comprising:

a first shaft (112) disposed in combination with and coaxially aligned with said rotational axis (52$_A$) of said jettison lever (52), said first shaft (112) having a arcuate slot (116) defining an slot end (116$_E$);

a second shaft (114) coaxially aligned with said first shaft (112);

an external jettison lever (110) disposed in combination with said second shaft (114) and operative for rotation about said rotational axis (52$_A$);

a drive pin (118) disposed in combination with said second shaft (114) and within said arcuate slot (116) of said first shaft (112), said drive pin (118) being positioned proximal to said end (116$_E$) of said arcuate slot (116) such that said drive pin (118) slides relative to said arcuate slot (116) in response to rotation of said jettison lever (52) through said operating positions and such that said drive pin (118) engages said slot end (116$_E$) to drive said first shaft (112) and said jettison lever (52) in response to rotation of said external jettison lever (110).

10. The emergency egress system (10) according to claim 1 wherein said retention devices (30) include at least one passive retention device (30$_{PA}$ or 30$_{PF}$) and at least one interactive retention device (130, 132) disposed about said upper and lower portions (12$_U$, 12$_L$), respectively, of said egress panel (12) and panel frame (14);

said passive retention device (30$_{PA}$ or 30$_{PF}$) including:

a retention pin (32) secured in combination with said egress panel (12);

a fitting (34) disposed in combination with said panel frame (14) and defining an aperture (35) for accepting said retention pin (32) and for providing lateral retention thereof in said normal operating mode;

said aperture (35) being configured to facilitate vertical disengagement of said retention pin (32) when said panel (12) is disposed at a predetermined angle with respect to said panel frame (14), said predetermined angle being effected by the passenger/crewmember in said emergency operating mode;

said interactive retention device (130, 132) including:

a retention fitting (132) disposed in combination with said panel frame (14), said retention fitting (132) defining a slot (134); and a latch member (130) disposed in pivotal combination with said egress panel (12) for alternately engaging and disengaging said slot (134) of said retention fitting (132) in said normal and emergency operating modes, respectively.

11. The emergency egress system according to claim 10 wherein said actuation means (50) includes:

a jettison lever (140) pivotally mounting to said egress panel (12) and defining first, second and third operating positions about an axis of rotation (140$_A$);

a drive plate (142) disposed in combination with said jettison lever (140) and being driven about said rotational axis (140$_A$) in response to rotation of said jettison lever (140); and a pull rod (144) disposed in combination with said drive plate (142) and said latch member (130) and operative for transferring rotational motion of said drive plate (142) to said latch member (130);

wherein said latch member (130) is engaged with said retention fitting (132) in said first operating position;

wherein said jettison lever (140) is rotated from said first to said second operating positions to disengage said latch members (130) from said retention fittings (132); and wherein said jettison lever (140) is rotated from said second to said third operating positions to actuate said cam means (80).

12. The emergency egress system (10) according to claim 11 wherein said cam means (80) includes:

a cam member (150) disposed in combination with said jettison lever (140); and a cam reaction surface (152) disposed in combination with said panel frame (14);

wherein said cam member (150) engages said cam reaction surface (152) to effect disengagement of said weather strip (16).

13. The emergency egress system (10) according to claim 12 wherein said cam means (80) is disposed proximal to a corner (12$_C$) of said egress panel (12).

\* \* \* \* \*